United States Patent [19]
Holl

[11] 3,769,951
[45] Nov. 6, 1973

[54] THROTTLE CONTROL DEVICE
[75] Inventor: William H. Holl, Flint, Mich.
[73] Assignee: General Motors Corporation, Detroit, Mich.
[22] Filed: Oct. 10, 1972
[21] Appl. No.: 295,815

[52] U.S. Cl............ 123/103 C, 123/98, 123/103 E
[51] Int. Cl........................ F02d 11/08, F02d 11/04
[58] Field of Search............. 123/98, 103 C, 103 R, 123/103 E

[56] References Cited
UNITED STATES PATENTS
| | | | |
|---|---|---|---|
| 2,139,832 | 12/1938 | Leibing | 123/103 C |
| 2,246,348 | 6/1941 | Coffey | 123/98 |
| 2,529,437 | 11/1960 | Weinberger | 123/103 C |
| 2,825,418 | 3/1958 | Kershman | 123/103 C |
| 2,894,500 | 7/1959 | Nallinger | 123/98 |
| 3,216,692 | 11/1965 | Walker | 123/98 |

*Primary Examiner*—Wendell E. Burns
*Attorney*—J. L. Carpenter et al.

[57] ABSTRACT

A throttle control device for an internal combustion engine wherein the movable wall of a dual chamber pneumatic power unit is connected to a throttle rod and the housing of the power unit is connected to the accelerator rod, the two chambers of the power device being connected to engine intake manifold vacuum with a flow restriction in the flow path to one of the chambers.

5 Claims, 1 Drawing Figure

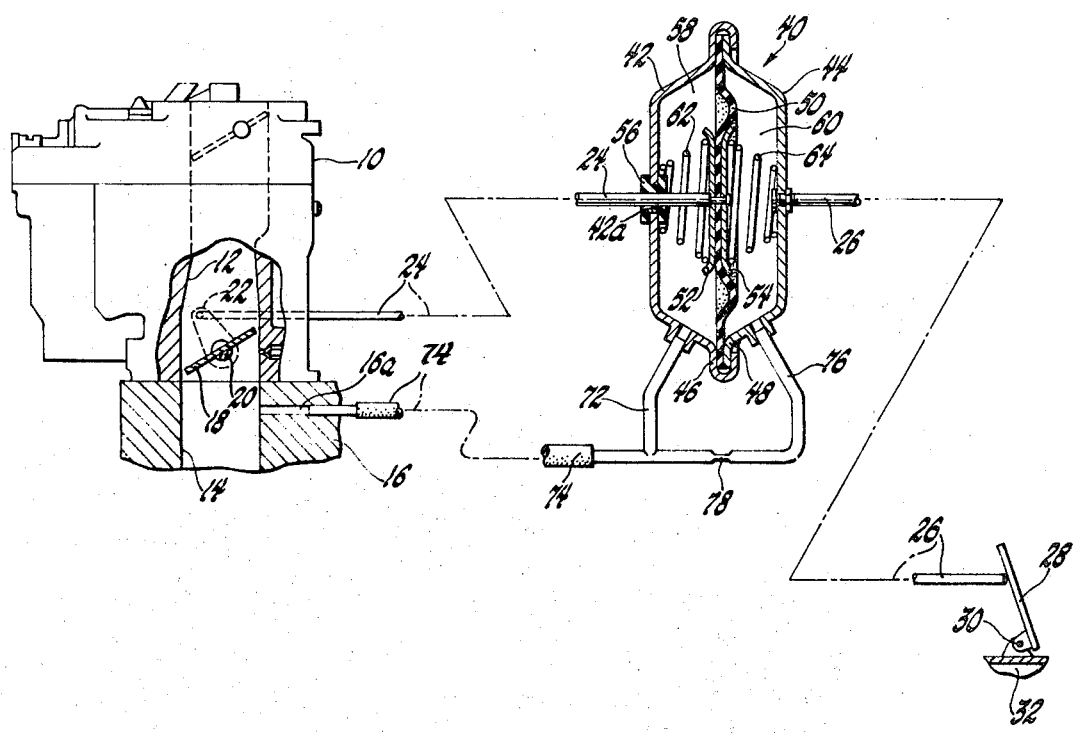

THROTTLE CONTROL DEVICE

This invention relates to a throttle control device for the internal combustion engine of a vehicle and, in particular, to a throttle control device with vacuum sensor.

Many automobile drivers operate the accelerator pedal in sudden, jerky movements thereof. Sudden, jerky motion of the accelerator pedal during operation of the engine of a present day vehicle can result in an increase in undesirable exhaust emissions. This is due to transient but large imbalances of the air-fuel ratio to the engine caused by such factors as fuel inertia relative to air, power enrichment, disproportionate booster shots of fuel, manifold wall wetting and vaporization, incomplete fuel vaporization and non-homogeneous air-fuel mixing in the cylinder. Engine missing due to a suddenly rarified air-fuel charge and a lag in spark timing changes can also increase emissions.

Various throttle control devices have been disclosed in the prior art to compensate for the erratic operation of the accelerator pedal by the vehicle operator. However, none of these prior art devices were designed to function directly as a function of the operating condition of the engine at the time of sudden, jerky accelerator pedal movement.

It is therefore the primary object of this invention to provide a throttle control device whereby sudden, jerky accelerator pedal movements are compensated for directly as a function of the operating condition of the engine so that the throttle movement is affected in a more desirable smooth manner.

Another object of this invention is to provide a throttle control device in which a unit in the throttle linkage controls the effective length of the linkage in accordance with engine intake manifold vacuum.

These and other objects of the invention are attained by means of a dual chamber pneumatic power unit attached to an otherwise conventional automotive acceleration linkage controlling throttle movement, the frame of this device being rigidly fastened to the accelerator pedal rod for movement therewith, the diaphragm separating the chambers of this unit being fastened to the throttle rod and one of the chambers of this unit being connected to the engine intake manifold through an unrestricted duct and the other chamber being connected to the intake manifold through a restricted duct.

For a better understanding of the invention, as well as other objects and further features thereof, reference is had to the following detailed description of the invention to be read in connection with the accompanying drawings, wherein:

The FIGURE is a schematic view of the throttle control device of the invention, with the pneumatic power unit of this device in the throttle control linkage shown in section to illustrate the details of its construction.

Referring now to the drawing, the vehicle engine, not shown, is provided with a carburetor 10 providing an induction passage 12 in communication with the induction passage 14 in the engine intake manifold 16. A throttle valve 18 is mounted on a shaft 20 rotatably disposed in the induction passage 14 and is operated by a throttle lever 22 fixed at one end to the shaft 20 and at its other end pivotally connected to a throttle rod 24 forming part of the accelerator linkage of the vehicle. As shown, throttle rod 24 is aligned with the accelerator rod 26 actuated by the accelerator pedal 28 pivotally mounted by hinge 30 to the floor board of the vehicle 32. Throttle rod 24 and accelerator rod 26 are yieldingly interconnected at their mutually adjacent ends through a dual chamber pneumatic power unit 40. As is conventional, a tension spring, not shown, is suitably operatively connected to the throttle lever 22 to normally bias the throttle 18 to its closed position.

The dual chamber pneumatic power unit 40 can be of any desired configuration having a housing divided into a pair of chambers by a movable wall and, in the embodiment disclosed, is a diaphragm type unit. As shown, the power unit 40 includes a housing made of two generally cup-shaped metal halves 42 and 44 which have flanges 46 and 48 between which the periphery of a flexible diaphragm 50 is interposed. A portion of the flange 46 is turned over the flange 48 to retain these elements in unit assembly.

The housing half 44 is rigidly fixed to the end of the accelerator rod and moves axially with the rod 26 as the latter is actuated by the accelerator pedal 28. The central portion of the diaphragm 50 is sandwiched between two dish-shaped retainers 52 and 54 and fixed to the reduced end of the throttle rod 24 for axial movement therewith, this throttle rod slidably projecting through a sliding seal 56 secured in the aperture 42a of the housing half 42.

The diaphragm 50 divides the housing into two chambers 58 and 60 and is normally centered to a neutral position within this housing by centering, coiled springs 62 and 64, the spring 62 being interposed between the housing half 42 and the retainer 52 while the spring 64 is interposed between the housing half 44 and the retainer 54.

The chamber 58, the left-hand chamber as seen in the drawing, is connected by a conduit 72 and a flexible hose or conduit 74 to a source of intake manifold vacuum pressure as by having the flexible conduit 74 in communication with the passage 16a in the intake manifold leading to the induction passage 14 therein. The chamber 60, the right-hand chamber as seen in the drawing, is also connected to the intake manifold vacuum pressure by means of a conduit 76 and a restricted orifice 78, of predetermined size, in communication via the conduit 72 and flexible conduit 74 with the induction passage 14 in intake manifold 16.

With this arrangement, the chamber 58, the left-hand chamber, is connected directly to the intake manifold through a relatively unrestricted duct system so that at all times, the pressure in chamber 58 will be essentially equal to the pressure in the intake manifold. The chamber 60, the right-hand chamber, on the other hand is connected to the intake manifold and in effect to the chamber 58 through a flow restricted duct system, the calibrated orifice 78 providing this flow restriction. Thus, the pressure in chamber 60 will always lag any changes in the intake manifold pressure and also the pressure in chamber 58 due to the time delay that results from fluid flow through the orifice 78.

In the steady state condition of operation, that is, with no changes in intake manifold pressure, the pressure in chamber 60 will become equal to the intake manifold pressure in the induction passage 14 and thus equal to the pressure in chamber 58. Under these conditions, there is no differential pressure on opposite sides of the diaphragm 50 and therefore no relative displacement of this diaphragm from its neutral position as originally established by the springs 62 and 64.

The dynamic operation of the subject throttle control device can best be understood by consideration of a step change from one steady state engine operating condition to another engine operating condition. If, for example, the accelerator pedal 28 is moved in a discreet step from one position to another to accelerate the engine, the accelerator rod 26 is moved to the left, with reference to the drawing, with the housing of the power unit 40 moving an equivalent amount due to its rigid connection to the accelerator rod 26. As this occurs, the diaphragm 50, the throttle rod 24 and the throttle valve 18 start to move to effect increased throttle opening. This will cause the manifold pressure in the induction passage 14 to change and this changed induction pressure will be transmitted fully to the chamber 58. However, the pressure in the right-hand chamber 60 will not change as rapidly due to the restriction formed by the orifice 78 in the flow path to and from this chamber so that a differential pressure will exist on opposite sides of the diaphragm 50, the higher pressure being in chamber 58, which causes the diaphragm to move to the right as seen in the drawing. This movement of the diaphragm to the right will in effect decrease the rate of motion of the throttle rod 24 to the left to a value below that of the motion of the accelerator rod 26 to the left. Accordingly, the throttle valve 18 is opened an amount less than that which would otherwise occur in relation to the movement of the accelerator rod 26. However, depending on the time delay, as determined by the size of the orifice 78, the pressure in the chamber 60 will become equal to the pressure in chamber 58 to center the diaphragm 50 in the housing of the power unit 40 so that further movement of the throttle rod 24 to the left is affected so that the total movement of the throttle rod after this time interval will have the same value as if the accelerator pedal and throttle valve were rigidly fastened together through a conventional accelerator linkage.

Similar operation, but in reverse, is obtained if the accelerator pedal is suddenly moved to decrease engine speed. The net effect whether accelerating or decelerating is to provide a dampened response of the throttle valve 18 to rapid changes of the accelerator pedal position.

It will be apparent to those skilled in the art that various modifications can be made to the throttle control device disclosed without departing from the scope of the invention. For example, it is apparent that separate conduits, each having a flexible portion, can be used to connect the chambers 58 and 60 to the engine induction passage 14 with the conduit to chamber 60 having an orifice therein to restrict flow to this chamber or, alternately, chamber 58 can be in direct communication with the engine induction passage and a separate conduit having an orifice therein can be used to connect chamber 58 to chamber 60.

What is claimed is:

1. A throttle control device for controlling the operation of the throttle valve of an engine to regulate the air flow into the induction passage in the intake manifold of the engine, the throttle control device including an accelerator rod actuated at one end by an accelerator pedal, a throttle rod axially aligned with said accelerator rod and operatively connected at one end to said throttle valve, a pneumatic power unit having a housing divided into first and second chambers by a movable wall, said housing being fixed on its second chamber side to the opposite end of said accelerator rod, said throttle rod slidably extending through said housing and said first chamber and being operatively connected at its end opposite said throttle valve to said movable wall for movement therewith, free flow passage means, including a flexible portion, connecting said first chamber to said induction passage in said intake manifold and, flow restricted passage means connecting said second chamber in communication with said first chamber.

2. A throttle control device according to claim 1 wherein said movable wall of said pneumatic power unit is a flexible diaphragm fixed at its outer periphery to said housing and wherein said pneumatic power unit includes a pair of coiled springs positioned in said housing, one of said coiled springs on each side of said diaphragm in abutment thereagainst to normally bias said diaphragm to a neutral position within said housing.

3. A throttle control device for controlling the operation of the throttle valve of a carburetor on an engine to regulate the air-fuel flow to the induction passage in the intake manifold of the engine, the throttle control device including a throttle rod operatively connected at one end to said throttle valve, a pneumatic power unit including a housing having a diaphragm mounted therein to form with said housing a first chamber and a second chamber, a manually operated, axial movable accelerator rod positioned axially in alignment with said throttle rod and fixed at one end adjacent to said throttle rod to said housing on the second chamber side of said housing, the other end of said throttle rod slidably extending through the opposite side of said housing and being fixed to said diaphragm, first spring means and second spring means positioned in said housing in said first chamber and said second chamber, respectively, to normally bias said diaphragm to a neutral position within said housing and conduit means, inclusing a flexible hose portion, connecting said first chamber and said second chamber to said induction passage, said conduit means further including a fluid flow restriction to restrict fluid flow between said second chamber and said induction passage.

4. In combination with the throttle valve and intake manifold of an internal combustion engine and a manually accelerator pedal operated, axial movable accelerator rod, a pneumatic power unit housing fixed at one end to said accelerator rod opposite said accelerator pedal, a flexible diaphragm centrally mounted in said housing and forming with said housing a first chamber and a second chamber with said second chamber on said one end of said housing, a throttle rod fixed at one end to said flexible diaphragm and slidably and sealingly extending through the opposite side of said housing in axial alignment with said accelerator and being operatively connected at its opposite end to said throttle valve, conduit means including a flexible conduit connecting said intake manifold to said first chamber and to said second chamber, said conduit means further including a flow orifice closely adjacent to said second chamber to restrict fluid flow between said intake manifold and said second chamber.

5. In the combination of claim 4 further including first spring means and second spring means positioned in said housing on opposite sides of said diaphragm to normally bias said diaphragm to a neutral position in the center of said housing.

* * * * *